L. H. STEPHENSON.
CAMERA SHUTTER.
APPLICATION FILED OCT. 18, 1919.

1,434,164.

Patented Oct. 31, 1922.

Inventor
Lowell H. Stephenson.

By Geo. F. Kimmel
Attorney

L. H. STEPHENSON.
CAMERA SHUTTER.
APPLICATION FILED OCT. 18, 1919.
1,434,164.
Patented Oct. 31, 1922.
2 SHEETS—SHEET 2.
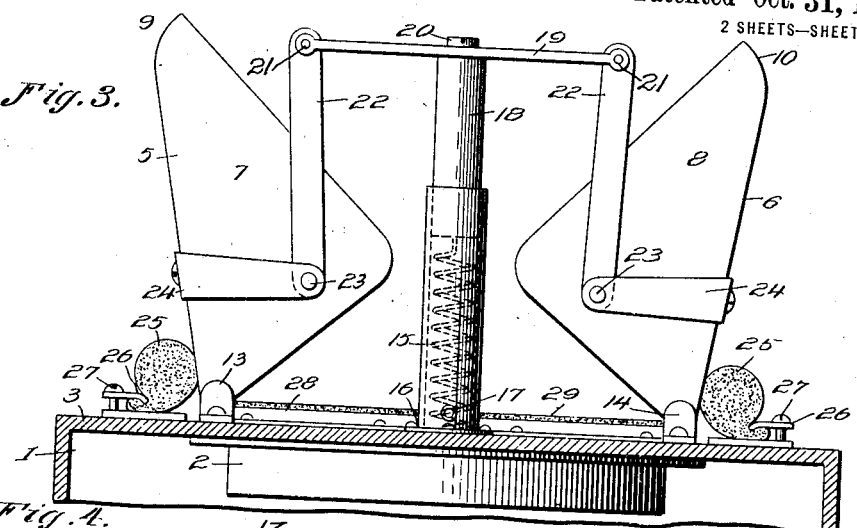
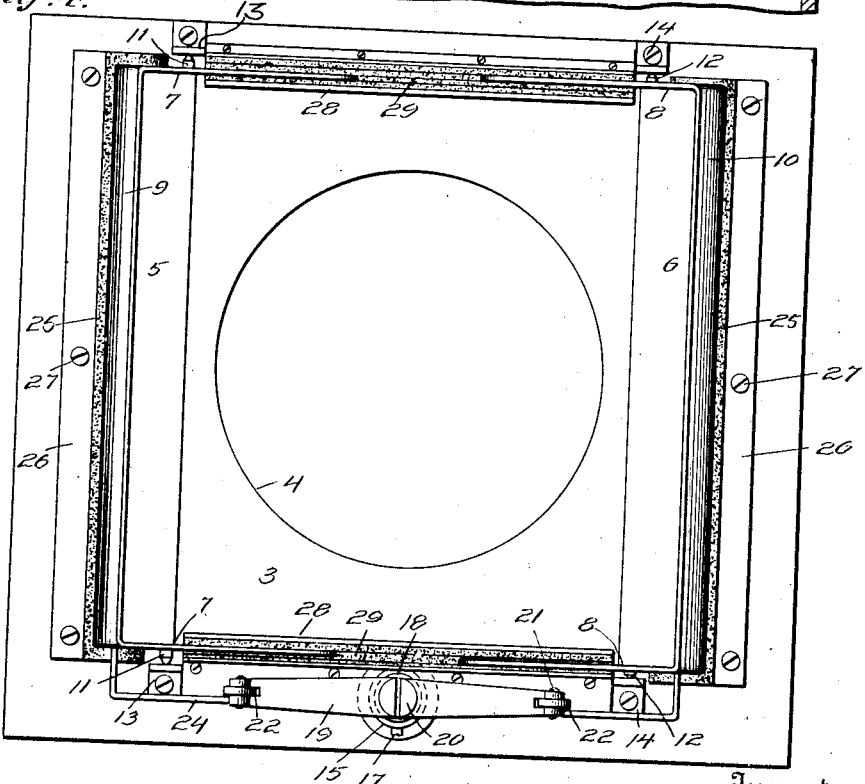
Inventor
Lowell H. Stephenson.
By Geo. P. Kimmel.
Attorney Patented Oct. 31, 1922.

1,434,164

UNITED STATES PATENT OFFICE.

LOWELL H. STEPHENSON, OF CLEVELAND, OHIO.

CAMERA SHUTTER.

Application filed October 18, 1919. Serial No. 331,575.

*To all whom it may concern:*

Be it known that I, LOWELL H. STEPHENSON, a citizen of the United States, residing at Cleveland, in the county of Cuyahoga and State of Ohio, have invented new and useful Improvements in Camera Shutters, of which the following is a specification.

The present invention relates to photography and more particularly to new and useful improvements in camera shutters.

An object of my invention is to provide in a simple, cheap and effective structure an improved camera shutter arranged to permit ingress of a maximum amount of light in a minimum amount of time.

Another object of my invention is to provide a camera shutter which, when in operation, is practically noiseless and when open is completely out of the scope of the lens, and when closed completely excludes all light.

A further object of my invention is to provide improved operating means for the sectional shutter, which means is positive and unfailing in operation.

Other objects and advantages to be derived from the use of my invention will appear from the following detailed description, taken in connection with an inspection of the accompanying drawings, in which—

Figure 3 is a similar view showing the shutter in open position, and Figure 4 is a view similar to Figure 1 showing the shutter in open position.

Referring more particularly to the drawings, in which similar characters of reference designate like and corresponding parts throughout the several views, 1 designates what may be termed the body of the camera, the usual lens holder 2 being supported on the end wall 3 of said camera. The usual opening 4 is provided in the wall 3.

Figure 1:
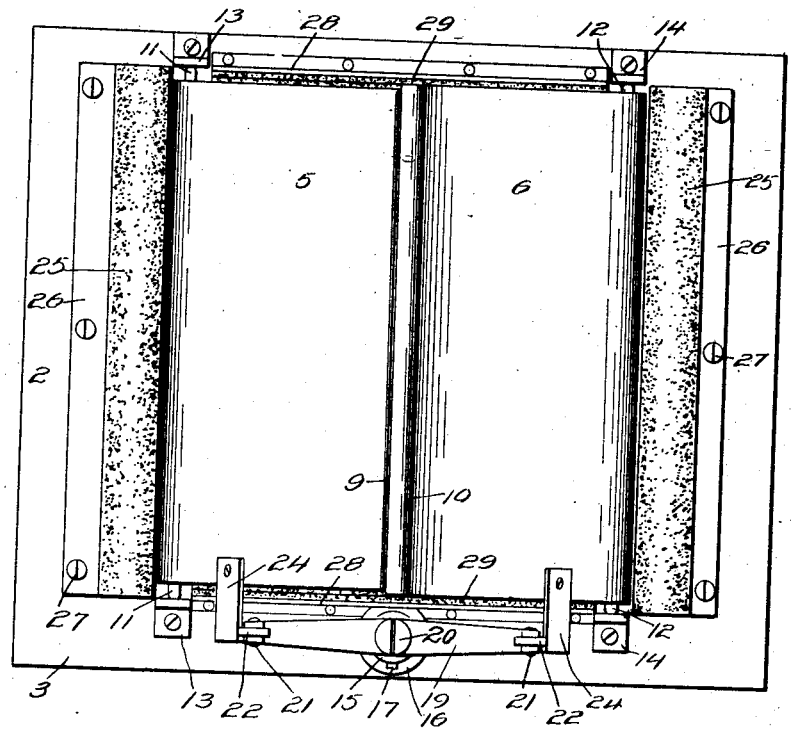
Figure 1 is a front elevational view of my improved camera shutter showing the same in closed position.
Figure 2:
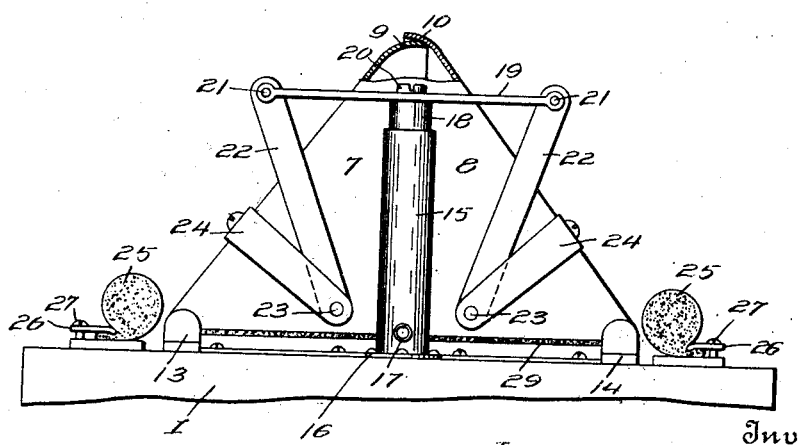
Figure 2 is an end elevational view of the same, a portion of the shutter sections being in section.

My improved shutter comprises two sections 5 and 6 substantially identical in construction and formed from sheets of metal having their end portions bent at right angles thereto to form end walls 7 and 8 respectively. These walls 7 and 8 are substantially triangular in configuration. The outer free marginal edges of the body portions of the sections 5 and 6 are inwardly curved as at 9 and 10 to form inter-engaging portions adapted to overlap when the sections are in closed position, as best shown in Figure 2. The sections are pivotally mounted, said sections having pivot pins 11 and 12 extending over their respective side walls for engagement in suitable brackets 13 and 14 respectively carried on the front wall 3 of the camera. When in closed position the sections 5 and 6 overlap as hereinbefore set forth, one of the sections being slightly larger than the other section, in this instance the section 6 being larger than the section 5, whereby to exclude all light.

The actuating mechanism of my invention may be manually controlled or may be pneumatically controlled, and in the present form of my invention I have shown the latter construction. I have provided a cylinder 15 fastened as at 16 to the wall 3 and having an inlet port 17 to which may be attached the usual hose and bulb. A piston 18 is reciprocally mounted in the cylinder 15 and carries a transverse arm 19 secured in position by means of a screw 20, said arm having pivotal connection at 21 with connecting links 22, which are in turn pivotally connected at 23 to brackets 24 rigidly carried by the shutter sections 5 and 6. A suitable coil spring 15$^a$ is placed in the cylinder 15 and connected with the piston 18 for returning the latter to normal closed position after each operation.

In order to render the device noiseless in operation I provide cushioning members comprising round strips of felt or the like designated 25 retained in position by means of clamping members 26 having fastening screws 27 associated therewith. The peripheral surface of the members 25 engage the body portions of the sections 5 and 6 when the latter are in open position as best shown in Figure 3. I provide light excluding means for the sections when in closed position, said means comprising channels 28 provided with felt linings 29 which receive and retain the inner marginal edges of the overlapping sections.

From the above description it is thought that a clear understanding of the operation of my invention may be had. It will be seen that when the piston is actuated by the usual bulk said piston will be moved to the position shown in Figure 3, this movement being imparted to the shutter sections by means of the links 22 and brackets 24. When the sections are in open position they are completely out of the scope of the camera lens and do not interfere with admission of light.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters Patent is:

1. The combination with a supporting base; of a camera shutter comprising a pair of sections hinged to said base, the outer free marginal edges thereof being curved for overlapping engagement when the sections are in closed position, cushioning means mounted on said base to abut the sections when in open position, and cushion channels adapted to receive the inner marginal edges of said sections when in closed position.

2. The combination with a supporting base; of a camera shutter comprising sections hinged to said base and normally overlapping to overlie the lens of the camera, an upright cylinder mounted on said base, a piston movable in said cylinder, a cross bar secured midway its ends to the outer end of the piston, a coiled spring in said cylinder connected with said piston to return it to normal after each operation, links connected with the shutter sections and with said cross bar, and means to operate said piston to open said shutter sections.

3. A camera shutter comprising a pair of sections hinged to a supporting structure and each having a blade and marginal edge at an angle to the blade, and a cushioning channel on said supporting structure to receive said marginal edge of each of the blades.

In testimony whereof I affix my signature hereto.

LOWELL H. STEPHENSON.